United States Patent
Han et al.

(10) Patent No.: US 6,624,563 B1
(45) Date of Patent: Sep. 23, 2003

(54) VIDEO SHIELD FOR MONITOR COMPRISING A BRACKET IN COMBINATION WITH AN ABSORBER AND A CONNECTOR

(75) Inventors: Sang-Hyun Han, Yongin (KR); Dae-Il Chung, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/468,825

(22) Filed: Dec. 22, 1999

(30) Foreign Application Priority Data

Feb. 13, 1999 (KR) .......................................... 1999/5278

(51) Int. Cl.$^7$ ............................................... H01J 31/00
(52) U.S. Cl. ...................................... 313/479; 348/830
(58) Field of Search ............................ 313/477 R, 479, 313/482; 348/184, 830, 829, 831; 439/296; 315/8, 85, 370; 335/214

(56) References Cited

U.S. PATENT DOCUMENTS

| | | | | |
|---|---|---|---|---|
| 4,392,083 A | * | 7/1983 | Costello | 315/85 |
| 5,294,994 A | * | 3/1994 | Robinson et al. | 315/85 |
| 5,399,939 A | * | 3/1995 | Greenberg et al. | 315/85 |
| 5,777,699 A | * | 7/1998 | Shim | 348/830 |
| 5,789,873 A | * | 8/1998 | Jeong | 315/370 |
| 5,841,234 A | * | 11/1998 | Jeong | 315/85 |

* cited by examiner

*Primary Examiner*—Vip Patel
*Assistant Examiner*—Joseph Williams
(74) *Attorney, Agent, or Firm*—Robert E. Bushnell, Esq.

(57) ABSTRACT

A video shield for a monitor is disclosed, which includes a video shield engaged at a rear end portion of the electron gun and having a predetermined shaped through hole through which the electron gun passes and having a plurality of snap holes formed around the through hole, a bracket being separable from the video shield wherein a circle hole is formed at a portion corresponding to the through hole, a plurality of displaceable distal members are formed on an inner surface of the circle hole at a certain distance from each other and are protruded in the front direction and pass through the through hole and surrounds an outer surface of the electron gun, and a plurality of snap members are protruded at a portion neighboring with the circle hole and are engaged with the snap holes, a first means for fixing the video shield at the electron gun by pressing the outer surfaces of the displaceable distal members at an outer surface of the electron gun by a snap method, and a second means for stably fixing the video shield at the electron gun by generating a certain friction force between an outer surface of the electron gun and the inner surfaces of the displaceable distal members in the case that the video shield is detachable in the interiors of the displaceable distal members, for implementing a simpler assembling process and decreasing an assembling time based on a snap method.

26 Claims, 6 Drawing Sheets

VIDEO SHIELD FOR MONITOR COMPRISING A BRACKET IN COMBINATION WITH AN ABSORBER AND A CONNECTOR

CLAIM OF PRIORITY

This application makes reference to, incorporates the same herein, and claims all benefits accruing under 35 U.S.C. §119 from an application for VIDEO SHIELD FOR MONITOR earlier filed in the Korean Industrial Property Office on the 13$^{th}$ of February 1999 and there duly assigned Ser. No. 5278/1999.

BACKGROUND OF THE INVENTION

1. Field of the Invention

The present invention relates to a video shield for a monitor, and in particular to a video shield for a monitor, the video shield easily assembled at and disassembled from the monitor.

2. Description of the Background Art

Video shields are used in a monitor. Typically, the video shield is mounted on the electron gun of the cathode ray tube (CRT) of the monitor. The monitor is directed to display a certain character, symbol, graphic, etc., on the screen of the cathode ray tube by amplifying a video signal from a printed circuit board and emitting on electron beam from an electron gun of the cathode ray tube. Electromagnetic waves are generated from the electron gun during operation of the cathode ray tube. An external shock may cause damage to the cathode ray tube of the monitor. Therefore the video shield is sometimes used to shield the electromagnetic waves and prevent any external shock to the cathode ray tube.

We have noticed, however, that in conventional electron guns and video shield structures, a plurality of screws are used for attaching the bracket to the front casing, and a clamp is tightened with threaded fasteners. In addition, since surface tape may be attached on the outer surface of the electron gun, the assembly is complicated, and the assembly time is substantial. Moreover, conventional apparatus and techniques are not adequate to absorb and reduce the force exerted by an external shock to the election gun. Furthermore, we have found that during the process of fixing the bracket at the front casing and displaceable distal member, tightening the screws may cause damage to the election gun of the cathode ray tube.

SUMMARY OF THE INVENTION

It is an object of the present invention to provide an improved apparatus and process able to shield electromagnetic waves generated by a cathode ray tube.

It is another object to provide an apparatus and process able to prevent an external shock to an electron gun of a cathode ray tube.

It is yet another object to provide an apparatus for providing a video shield suitable for easy installation during assembly of a monitor.

It is still another object to provide an improved video shield for decreasing that decreases the assembly time of the video shield and a cathode ray tube.

It is still yet another object to provide an improved video shield able to absorb an external shock applied to an electron gun.

These and other objects may be achieved by providing a video shield for a monitor that includes a front cover, a cathode ray tube engaged to a rear surface of the front cover, and has an electron gun mounted an end portion of the cathode ray tube. The video shield unit is engaged at a rear end portion of the electron gun and includes a snap ring, a rubber collar, a front casing, a bracket, a printed circuit board with a socket, and a rear casing. The front casing includes a shaped through hole through which the electron gun passes and a plurality of snap holes formed around the through hole. The bracket that is separable from the video shield and a circular hole is formed at a portion of the front casing corresponding to the through hole and includes a plurality of displaceable distal members formed on an inner surface of the circular hole at a spaced apart from each other and protruding in a frontal direction, passing through the through hole and surrounding an outer surface of the electron gun. A plurality of snaps protrude from snap holes formed around the circular hole and engage the snap holes. The shield includes snap ring tightening the video shield at the electron gun by pressing the outer surfaces of the displaceable distal members at an outer surface of the electron gun and a rubber collar the video shield at the electron gun by generating a friction force between an outer surface of the electron gun and the inner surfaces of the displaceable distal members so that the video shield is detachable from the interiors of the displaceable distal members.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
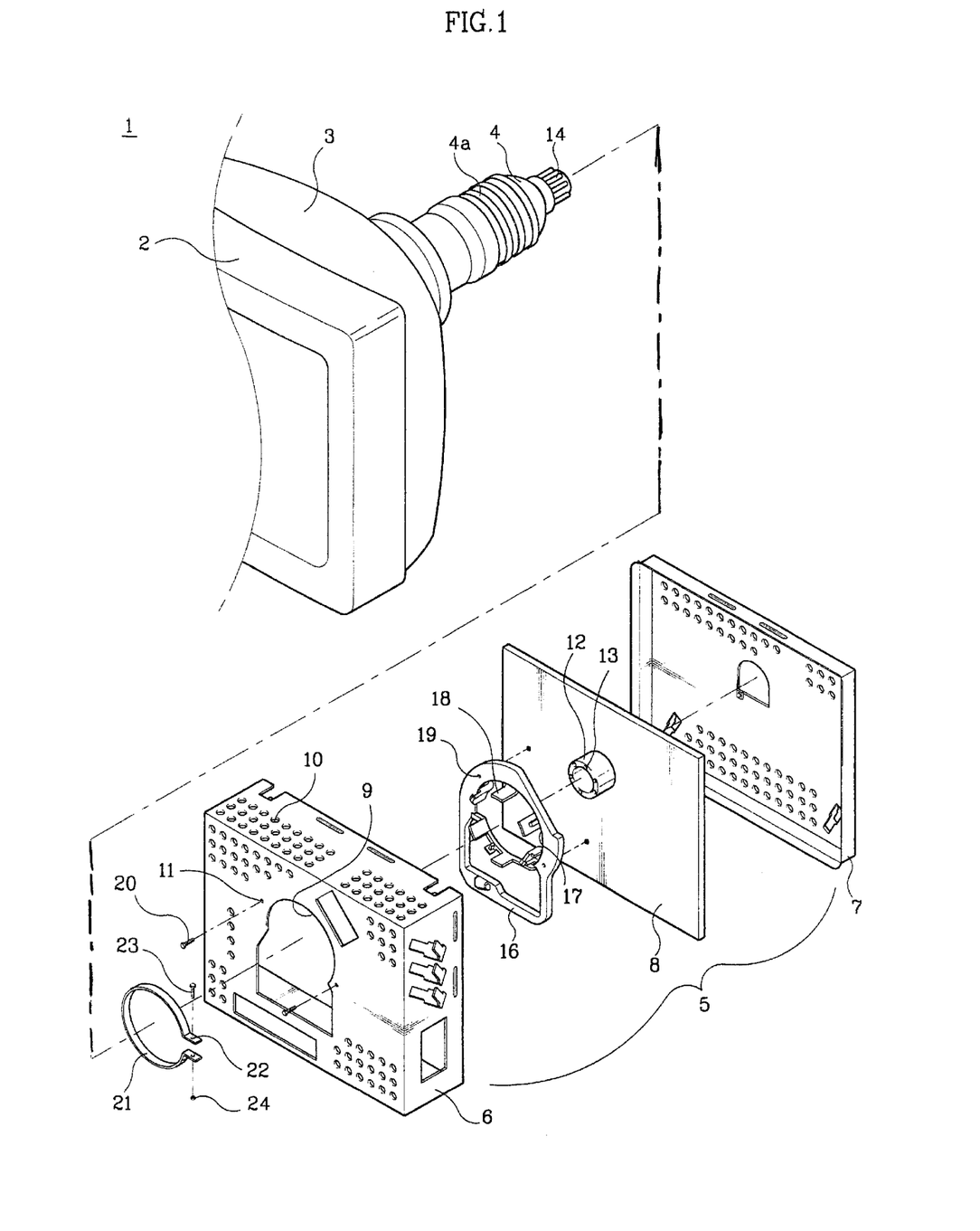
FIG. 1 is an exploded perspective view illustrating an inner structure of a video shield.
Figure 2:
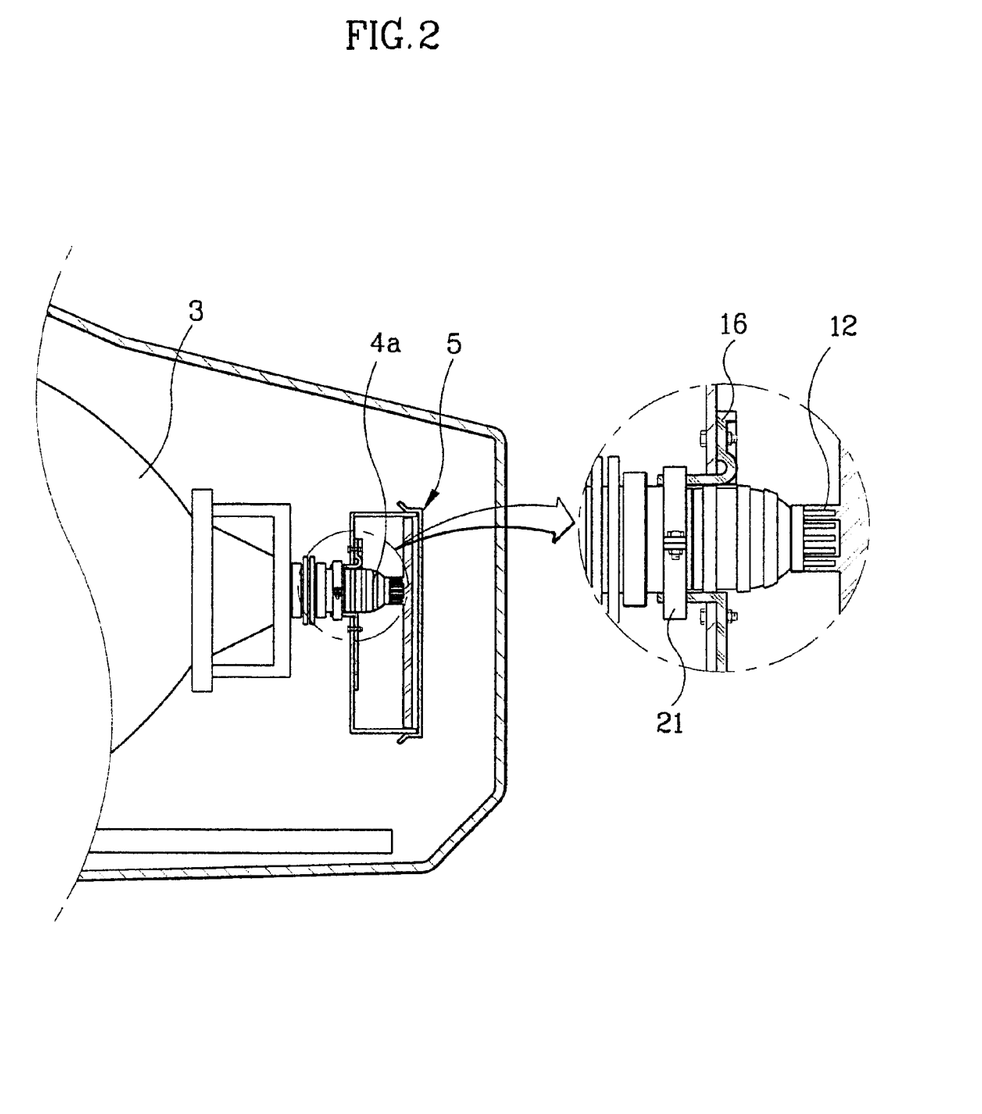
FIG. 2 is a cross-sectional view illustrating a structure of a video shield attached to a cathode ray tube.

Turning now to the drawings, FIG. 1 is an exploded perspective view illustrating an inner structure of a shield, and FIG. 2 is a cross-sectional view illustrating a structure that a video shield is engaged at a cathode ray tube.

As shown therein, a monitor 1 includes a front cover 2, a cathode ray tube 3 engaged with inner back surface of the front cover 2, an electronic gun 4 engaged with a rear portion of the cathode ray tube 3 that emits electron beams, a video shield 5 positioned at an end portion of the electron gun 4, and a rear cover (not shown) integrally engaged with a rear portion of the front cover 2. A plurality of neck pins 14 are installed at an end portion of the electron gun 4 for receiving video signals, and a surface tape 4a is wrapped around an outer surface of the electron gun 4. In addition, the video shield 5 includes a rear casing 7 integrally engaged with the front casing 6, and a video printed circuit board 8 positioned within an inner space formed between the front and rear casings 6 and 7.

The front casing 6 is formed in a rear side opened box shape, and a through hole 9 having a certain shape is formed at one side of casing 6, and a plurality of first holes 11 for fasteners are formed around through hole 9. A plurality of holes 10 perforate casing casings 6, 7 for air ventilation. A socket 12 is formed on an upper surface of the video printed circuit board 8. This socket 12 is cylindrical, and a plurality of holes 13 are formed at one surface of the socket 12. Therefore, a plurality of connecting pins 14 of the electron gun 4 pass through the through hole 9 and are inserted into the holes 13 of the socket 12. When the video shield 5 is engaged to the electron gun 4 in the interior of the video shield 5, the video shield 5 is held against the electron gun 4 with a bracket 16.

The bracket 16 has a certain shape structure similar to the through hole 9 of the front casing 6, and a circular hole 17 is formed on an upper portion of bracket 16. A plurality of displaceable displaceable distal members 18 are formed on an inner surface of the circular hole 17 at a certain distance from each other extend axially outwardly from hole 17 and toward through hole 9. A plurality of second holes 19 for fasteners are formed at a certain portion of the bracket 16.

Bracket 16 is integrally engaged at a back surface of the front casing 6 in such a manner that engaging screws 20 pass through the first engaging holes 11 of the front casing 6 and the second engaging holes 19 of the bracket 16 and are engaged. The displaceable distal members 18 pass through the through hole 9 of the front casing 6 and protrude in the front direction. Therefore, when the displaceable distal members 18 are inserted into the socket 12 of the video printed circuit board 8 via the circular hole 17 of the bracket 16, the displaceable distal members contact an outer surface of the electron gun 4.

A clamp 21 is used for pressing and fixing the displaceable distal member 18 at the outer surface of the electron gun 4 after the electron gun 4 is engaged to the socket 12. The clamp 21 is formed in the shape of an omega "Ω". An engaging hole 22 is formed at both ends of the clamp 21, respectively. The engaging screw 23 passes through the engaging hole 22 and is engaged with a nut 24. Elastic distally extending members 18 contact the outer surface of the electron gun 4 screw 23 is tightened after the clamp 21 encircles with the outer surfaces of the displaceable distal members 18 thereby attaching the video shield at the electron gun 4. The surface tape 4a is wound around an outer surface of the electron gun 4, and the inner surfaces of the elastic plates 18 contact the surface tape 4a based on a certain force, so that the video shield 5 is securely mounted upon the electron gun 4.

Figure 3:
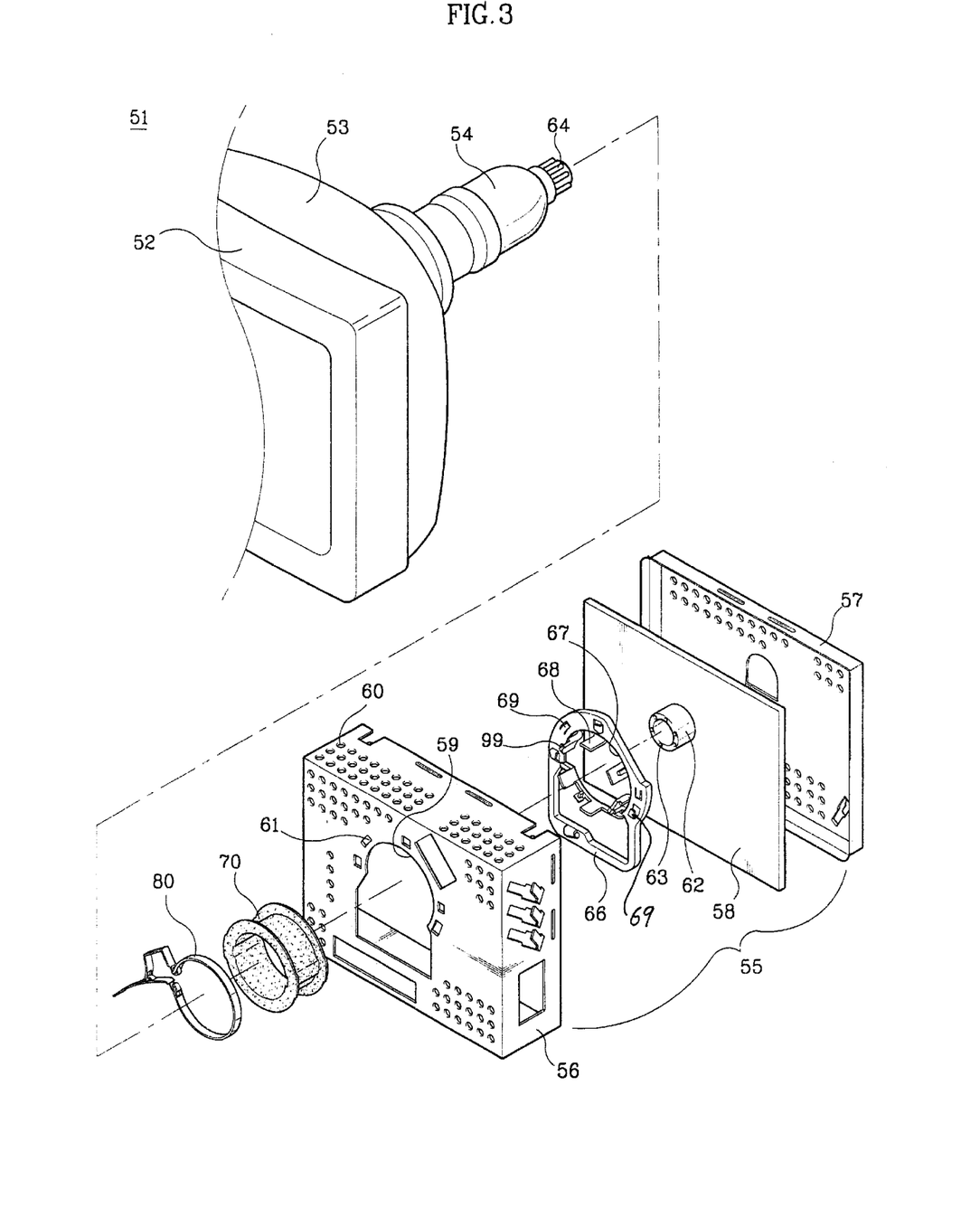
FIG. 3 is an exploded perspective view illustrating an inner structure of a video shield constructed according to the principles of the present invention.
Figure 4:
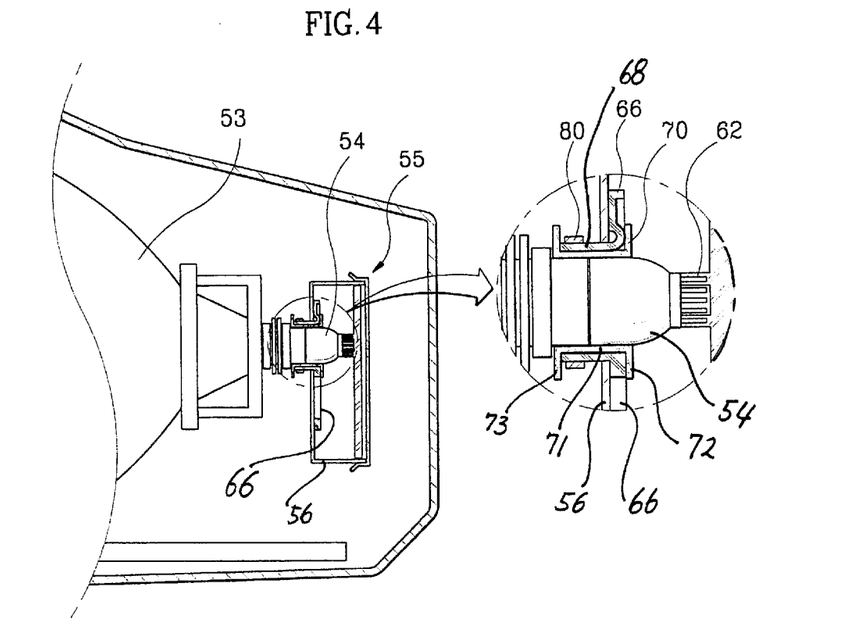
FIG. 4 is a cross-sectional view illustrating a structure with a video shield engaging an end portion of a cathode ray tube according to the principles of the present invention.

The embodiments of the present invention will be explained with reference to the accompanying drawings, beginning with FIG. 3, which illustrates an inner structure of the monitor in which a video shield is engaged according to the present invention, and FIG. 4 is a cross-sectional view illustrating a structure with a video shield engaged at an end portion of the cathode ray tube.

Monitor 51 includes a front cover 52, a cathode ray tube 53 engaged at a rear portion of the front cover 52, an electron gun 54 engaged at an end portion of the cathode ray tube 53 for emitting electron beams, a video shield 55 engaged at an end portion of the electron gun 54 for shielding electromagnetic waves and preventing damage to the electron gun due to externally applied forces, and a rear cover (not shown) integrally engaged at a rear portion of the front cover 52. A plurality of neck pins 64 protrude from an end portion of the electron gun 54 and serve as electrical conductors for receiving video signals.

The video shield 55 includes a front casing 56, a rear casing 57 integrally engaged with the front casing 56, a video printed circuit board 58 engaged in the interior space when the front and rear casings 56 and 57 are engaged, and a bracket 66 fixing the video shield 55 at the electron gun 54 when the video shield 55 is engaged at the electron gun 54. The front casing 56 is formed in a box shape having an end portion opened. A through hole 59 having a certain shape is formed at one side of the same. In addition, a plurality of snap holes 61 are formed around the through hole 59.

A cylindrical socket 62 is formed on an upper surface of the video printed circuit board 58. A plurality of pin holes 63 are formed on one surface of socket 62. Neck pins 64 of the electron gun 54 are inserted into the pin holes 63.

Bracket 66 has a shape similar to the through hole 59 in the front casing, and circular hole 67 is formed on the upper portion of bracket 66. A plurality of displaceable distal members 68 are formed on an inner surface of the circular hole 67 to extend a certain distance toward front casing 56. A certain displaceable distal member 68 among a plurality of displaceable distal members 68 has an engaging shoulder portion 99 extending from an outer end portion of the displaceable distal member 68. In addition, a plurality of snap members 69 are installed at a certain portion of the bracket 66. The snap members 69 protrude from one side of the bracket 66, and each end portion of each of the snap members 69 is curved in the vertical direction and is formed parallel to one surface of bracket 66.

Figure 5:
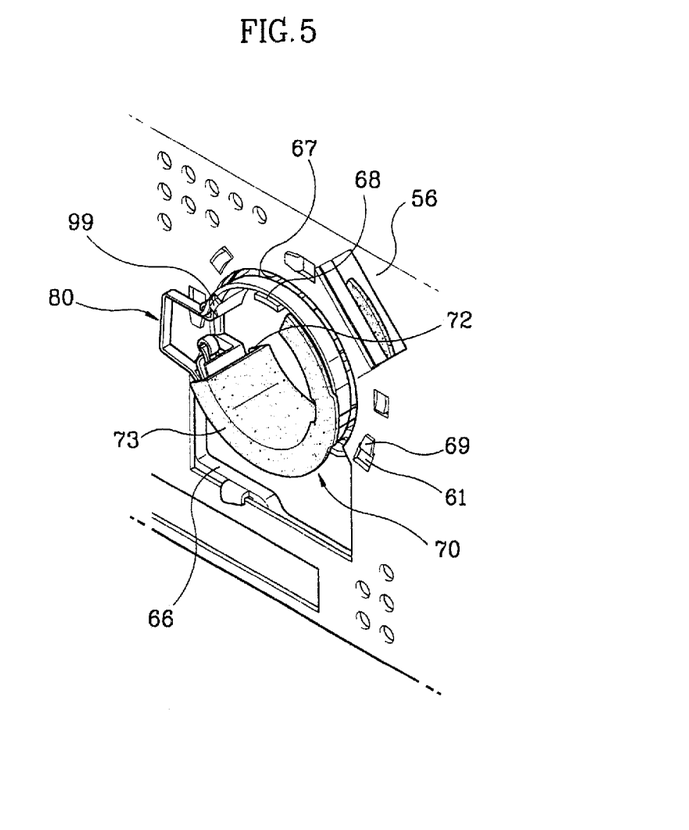
FIG. 5 is a partially cut-away and enlarged perspective view illustrating the assembled state of a video shield according to the present invention.

As shown in FIG. 5, when the bracket 66 is engaged to the front casing 56, the snap members 69 of bracket 66 are inserted into the snap hole 61 of the front casing 56. The snap members 69 are inserted into the snap hole 61 by rotating the bracket in the counterclockwise direction at a certain angle. Therefore, the bracket 66 is integrally engaged at the rear surface of the front casing 56. When removing bracket 66 from the front casing 56, the bracket 66 is rotated in the clockwise direction for thereby escaping the snap members 69 from the snap hole 61, so that the bracket 66 is separated from the front casing 56.

As shown in FIGS. 3 and 4, when the bracket 66 is attached to the front casing 56, a plurality of displaceable distal members 68 pass through the through hole 59 in the front casing 56 and protrude beyond through hole 59 by a certain distance. Therefore, the electron gun 54 passes through the through hole 59 in the front casing 56 and a plurality of displaceable distal members 68, and socket 62 of the video printed circuit board 58 and the inner surface of displaceable distal member 68 surround the neck of electron gun 54.

A snap-action adjustable ring 80 is positioned on an outer surface of the displaceable distal members 68 for tightening displaceable distal members 68 against the outer surface of the electron gun 54 to attach the video shield 55 to the electron gun 54 when the electron gun 54 passes between displaceable distal members 68 and is engaged with the socket 62.

Figure 7:
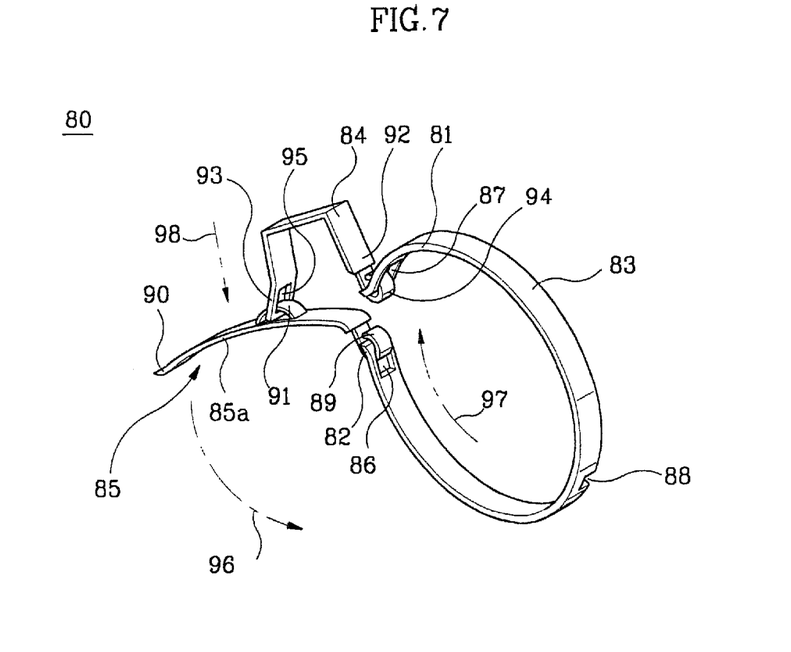
FIG. 7 is a perspective view illustrating an open snap ring constructed according to the principles of the present invention.
Figure 8:
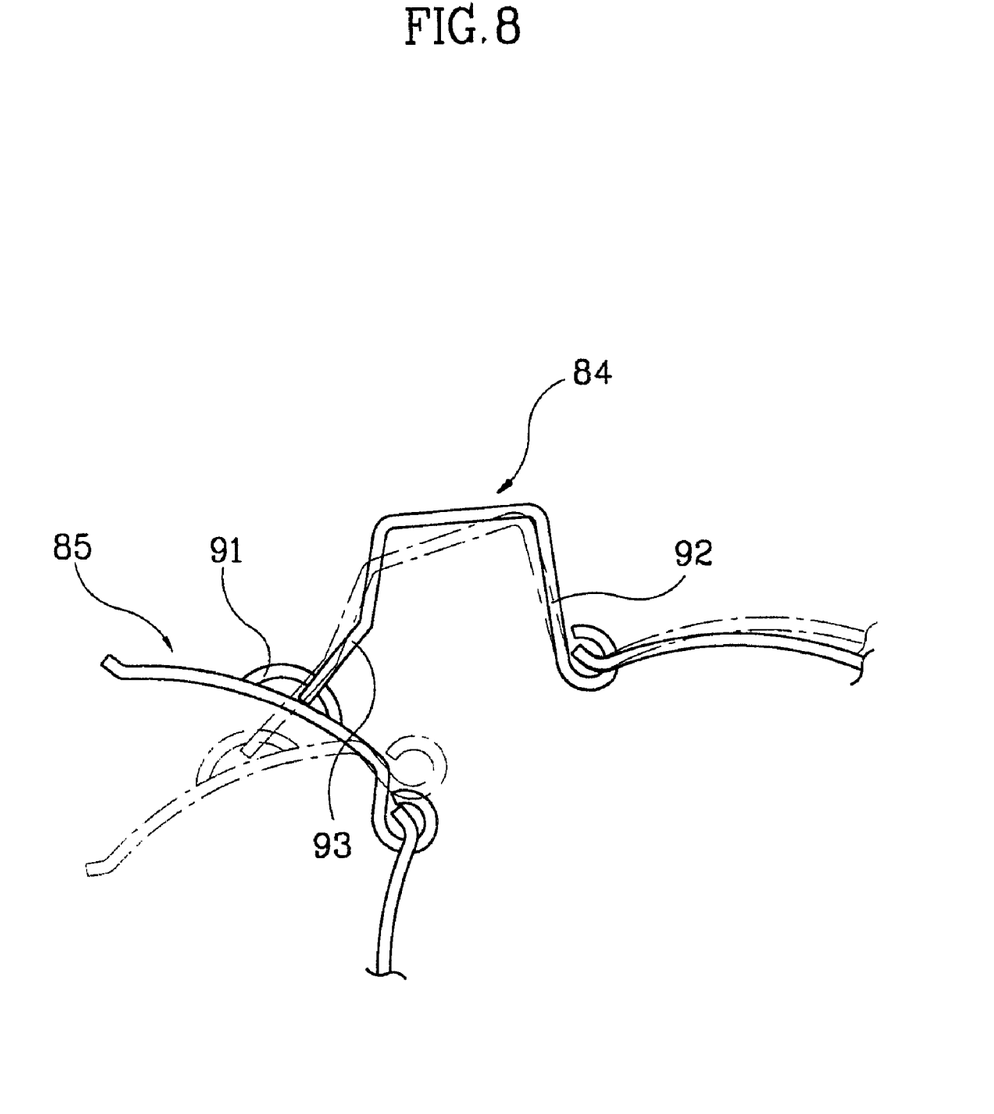
FIG. 8 is a schematic view illustrating the closure of an elastic portion of a snap ring during an assembly process according to the principles of the present invention.

As shown in FIGS. 7 and 8, the snap ring 80 includes a band 83 having a ring shape, an elastic portion 84 rotatably connected with a first end portion 81 of the band 83, and an engaging portion 85 rotatably engaged at a second end portion 82 of the band 83 and connected with the elastic portion 84. The band 83 is made of elastic material and includes first and second rectangular holes 87 and 86 formed at the first and second end portions 81 and 82. In addition, a rectangular groove 88 is formed at a circumferential portion of the band 83.

The engaging portion 85 includes a ring shaped end portion 89 that is rotatably connected at a portion of the second rectangular hole 86 formed at the second end portion 82 of the band 83. In addition, the other end portion 90 opposite to end portion 89 curved at a certain angle is a free end and operates as a handle. An intermediate portion 85a between end portion 89 and the other end portion 90 is cut in order to form an arcuate protrusion 91 that passes through opening 95 and loosely engages end portion 93. A second end portion 93 of the displaceable distal member 84 is connected to the engaging protrusion 91.

The displaceable distal member 84 is formed in an inverted U shape. The first end portion 92 is a ring-shaped end portion 94 which is rotatably connected to a portion of the first rectangular hole 87 of the first end portion 81 of the band 83. In addition, a rectangular hole 95 is formed at the second end portion 93 opposite to the first end portion 81. The rectangular portion 95 engages the protrusion 91 of the portion 85. Therefore, the displaceable distal member 84 is connected to the band 83 and the engaging portion 85. When the engaging portion 85 is pressed in the direction of a first arrow 96, the first and second end portions 92 and 93 which are initially spaced-apart, are drawn closer to each other. Therefore, the displaceable distal member 84 may allow the band 83 to engage the electron gun 54 with a diameter that is different from that of the electron gun 54 by a certain range. Namely, when a band is tightened to an element having a diameter larger than the diameter of the band, since the first and second end portions 92, 93 of the displaceable distal member 84 are spaced-apart by a certain distance based on the diameter of the band 83, so that it is possible for the band to tighten the element.

The engaging portion 85 is pressed in the direction of a first arrow 96, the end portion 89 of the engaging portion 95 pulls the second end portion 82 of the band 83 in the direction of a second arrow 97. The intermediate portion 85a pulls the second end portion 93 of the displaceable distal member 84 is a direction of a third arrow 98. Therefore, when both ends of the displaceable distal member 84 are spaced-apart by a certain distance, the second end portion 93 of the displaceable distal member 84 presses the engaging portion 85, so that the engaging portion 85 elastically contacts the outer surface of the band 83.

Therefore, the band 83 of the snap ring 80 tightens against an outer surface of the displaceable distal member 68 when the engaging portion 85 is pressed in the direction of first arrow 96 and the snap ring 80 engages the displaceable distal member 68 as is shown in FIG. 5.

At this time, the groove 88 formed at the band 83 engages one displaceable distal member 68 shown in FIG. 5 among the displaceable distal members, and prevents a free rotation of the snap ring 80 on an outer surface of the displaceable distal member 68 shown in FIG. 5. In addition, the snap ring 80 engages the engaging shoulder portion 99 formed at an end portion of the displaceable distal member 68 as shown in FIG. 5, so that it is possible to prevent the snap ring 80 from slipping from the displaceable distal member 68.

Figure 6:
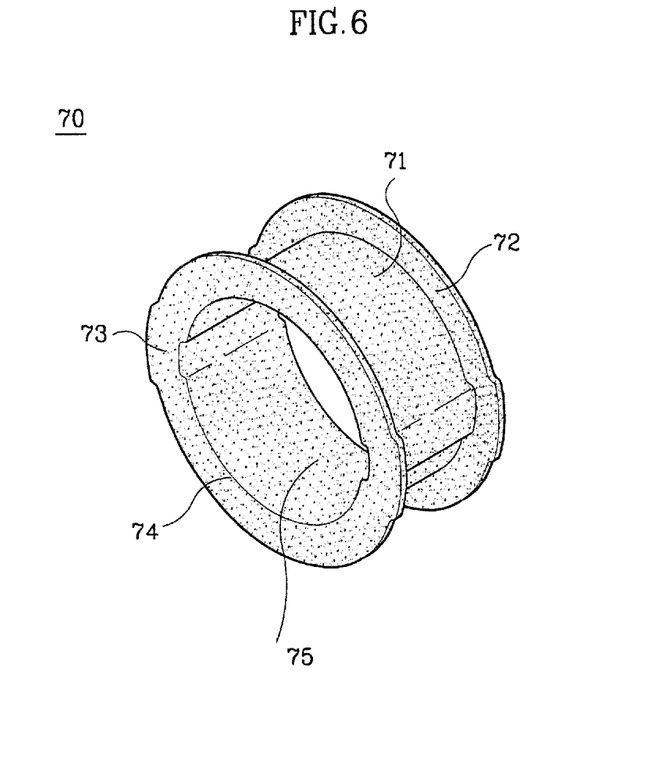
FIG. 6 is a perspective view illustrating a silicon rubber collar constructed according to the principles of the present invention.

As shown in FIGS. 3 and 4, the rubber collar 70 serves as a shock absorber, a buffer, and a damper by engaging the interior of the through hole 59 of the front casing 56. When the rubber collar 70 is inserted in the circular hole 67 of the bracket 66, the rubber collar 70 is positioned between an outer surface of the electron gun 54 and an inner surface of the displaceable distal member 68, so that the video shield 55 is stably positioned around the outer surface of the electron gun 54. As shown in FIG. 6, the rubber collar 70 can be made of silicone. Therefore, the shape of the rubber collar 70 may be changed within a certain range and has a certain friction coefficient. The rubber collar 70 includes a cylindrical body 71, and first and second flanges 72 and 73 extended from each circumferential surface of the openings 74 of the cylindrical body 71.

As shown in FIG. 5, when the rubber collar 70 engages the interior of the displaceable distal members 68, the first flange 72 is positioned at a rear surface of the bracket 66, and the cylindrical body 71 passes through the interiors of the displaceable distal members 68, and the second flange 73 is supported by the end portions of the displaceable distal members 68. When the snap ring 80 contacts with the outer surfaces of the displaceable distal members 68, the displaceable distal members 68 press the rubber collar 70. Since the rubber collar 70 presses an outer surface of the electron gun 54, the video shield 55 is stably fixed at the electron gun 54.

The operation of the video shield according to the present invention will be explained by reference to FIGS. 3, 5 and 7. When a user attaches the video shield 55 to the electron gun 54 of the cathode ray tube 53, bracket 66 is first attached to a rear surface of the front casing 56. Namely, the snap members 69 of the bracket 66 are inserted into the snap holders 61 of the front casing 56 and are rotated in a counterclockwise direction by a certain angle, and bracket 66 integrally engages a rear surface of the front casing 56. At this time, the displaceable distal members 68 of the bracket 66 extend through the through hole 59 of the front casing 56 by a certain distance.

After the bracket 66 engages the front casing 56, the rubber collar 70 is inserted into the inside of the displaceable distal members 68. Therefore, the first flange 72 of the rubber collar 70 contacts with the rear surface of the bracket 66, and the cylindrical body 71 of the rubber collar 70 contacts with the inner surfaces of the displaceable distal members 68, and the second flange 73 engages an end portion of the displaceable distal member 68.

After the snap ring 80 is inserted onto the displaceable distal members 68 via the second flange 73 and the engaging portion 85 of the snap ring 80 does not engage the band 83, the openings 74 of the rubber collar 70 are arranged to engage the electron gun 54, and the video shield 55 is pushed in the direction of the electron gun 54. The video shield 55 is pushed by a certain force until the neck pins 64 engage socket 62 of the video printed circuit board 58. When the neck pins 64 of the electron gun 54 fully engage pin holes 63 of socket 62, groove 88 formed in the periphery of one side of band 83 of the snap ring 80 is inserted onto engaging shoulder portion 99 formed on a corresponding displaceable distal member 68 among a plurality of the displaceable distal members 68. This prevents free rotation of the snap ring 80 against the outer surface of the elastic plate 68.

When the engaging portion 85 is pushed in the direction of first arrow 96, one end 89 of the engaging portion 85 pulls the second end portion 82 of the band 83 in the direction of second arrow 97. At the same time, the intermediate portion 85a pulls the second end portion 93 in the direction of third arrow 98. Therefore, when both ends 92 and 93 of the displaceable distal member 84 are spaced-apart from each other by a certain distance based on the diameters of the displaceable distal members 68, the second end portion 93 of the displaceable distal member 84 presses the engaging portion 85, so that the engaging portion 85 elastically contacts the outer surface of the band 83. Since both ends of the elastic portion 84 are easily deformable by a certain distance, various diameters of electron guns may be adaptable. Therefore, the snap ring 80 tightens the displaceable distal members 68, and the displaceable distal members 68 press the rubber collar 70 and is stably positioned around an outer surface of the electron gun 54. As a result, the video shield 55 is integrally attached to an end portion of the electron gun 54.

As described above, with the video shield of the monitor according to the present invention, the bracket is engaged at the front casing of the video shield by the snap-action, and the video shield is connected to the electron gun by using the snap ring placed around the silicone rubber, so that it is possible to implement a simpler assembly line process while decreasing the time, required for assembly. Moreover, snap ring having an elastic portion and an engaging portion tightens the shield on the electron gun without giving too much tension to the electron gun and breaking the neck of cathode ray tube. Furthermore, the absorber formed in a single body absorbs the external shock and provide an implementation of a simpler assembly line process.

What is claimed is:

1. A display apparatus having a cathode ray tube, comprising:
    an electron gun formed on said cathode ray tube to form variable visual images upon a screen of the cathode ray tube;
    a shield unit connected to said cathode ray tube, said shield unit comprising a case shielding a circuit board connected to said electron gun;
    a bracket attached to said shield unit, said bracket including a plurality of snap members and a plurality of axially extending distal members, said snap members inserted into a plurality of holes formed on said case, said distal members holding said electron gun;
    an absorber made of a deformable and resilient material and disposed between said bracket and said electron gun; and
    a connector attaching said shield unit to said electron gun through said bracket and said absorber.

2. The display apparatus of claim 1, further comprised of said bracket attached to said case without using a screw by rotating said bracket after said snap members have been inserted into said holes.

3. The display apparatus of claim 1, further comprised of:
    a stopper formed on one of said distal members; and
    a fixing groove formed on said connector, said fixing groove engaging said stopper so as to prevent a free movement of said connector when said connector fixes said shield unit.

4. The display apparatus of claim 1, further comprised of a flange formed on said absorber, said flange covering one end of said distal member.

5. The display apparatus of claim 1, further comprised of said connector including a band portion surrounding a portion of said distal members and an elastic portion connecting two ends of said band portion.

6. The display apparatus of claim 5, further comprised of said two ends of said band portion being space-apart by a distance in dependence upon a state of said distal members.

7. The display apparatus of claim 1, further comprised of said absorber formed in a single body, having a cylindrical body surrounding said electron gun.

8. The display apparatus of claim 1, further comprised of said absorber formed of one of rubber material and a silicone material.

9. A display apparatus having a cathode ray tube, comprising:
    an electron gun formed on said cathode ray tube to form variable visual images upon a screen of the cathode ray tube;
    a shield unit connected to said cathode ray tube, said shield unit comprising a case shielding a circuit board connected to said electron gun;
    a bracket attached to said shield unit, said bracket including a plurality of displaceable distal members holding said electron gun;
    an absorber made of a deformable and resilient material and disposed between said bracket and said electron gun, including a cylindrical body surrounding said electron gun; and
    a connector attaching said shield unit to said electron gun through said bracket and said absorber.

10. The display apparatus of claim 9, further comprised of said absorber being formed in a single body, having a cylindrical body surrounding said electron gun.

11. The display apparatus of claim 9, further comprised of said absorber formed of one of a rubber material and a silicone material.

12. The display apparatus of claim 9, further comprised of a flange formed on said absorber, said flange covering one end of said distal member.

13. The display apparatus of claim 9, further comprised of said connector including a band portion surrounding a portion of said distal members and an elastic portion connecting two ends of said band portion.

14. The display apparatus of claim 13, further comprised of said two ends of said band portion being space-apart by a distance in dependence upon a state of said elastic portion.

15. The display apparatus of claim 9, further comprised of a plurality of snap member formed on said bracket, said plurality of snap members inserted into a plurality of holes formed on said case.

16. The display apparatus of claim 9, further comprised of:
    a stopper formed on one of said distal members; and
    a groove formed on said connector, said groove engaging said stopper so as to prevent a free rotation of said connector.

17. A display apparatus having a cathode ray tube, comprising:
    an electron gun formed on said cathode ray tube;
    a shield unit connected to said cathode ray tube, said shield unit having a case shielding a circuit board connected to said electron gun;
    a bracket attached to said shield unit, said bracket including a plurality of displaceable distal members extending distally from said bracket holding said electron gun;
    an absorber made of a deformable and resilient material and disposed between said bracket and said electron gun; and a connector attaching said shield unit to said electron gun through said bracket and said absorber, said connector having a band portion surrounding a portion of said elastic members and an elastic portion connecting two ends of said band portion, said connector tightening said elastic members by using said elastic members.

18. The display apparatus of claim 17, further comprised of said two ends of said band portion being space-apart by a distance in dependence upon a state of said elastic portion.

19. The display apparatus of claim 17, further comprised of:

a stopper formed on said elastic member; and a groove formed on said connector, engaging said stopper so as to prevent rotation of said connector.

20. The display apparatus of claim 17, further comprised of said absorber formed in a single body, said absorber covering said electron gun.

21. The display apparatus of claim 17, further comprised of said absorber formed in a single body, said absorber covering said electron gun.

22. The display apparatus of claim 17, further comprised of a flange formed on said absorber, said flange covering one end of said elastic member.

23. A display apparatus having a cathode ray tube, comprising:

an electron gun formed on said cathode ray tube;

a shield unit connected to said cathode ray tube, said shield unit including a case shielding a circuit board connected to said electron gun and a bracket holding said electron gun;

an absorber made of a deformable and resilient material and disposed between said bracket and said electron gun and formed of a single body; and a connector attaching said shield unit to said electron gun through said bracket and said absorber, said connector having a band portion surrounding said bracket and an elastic portion connecting two ends of said band portion.

24. The display apparatus of claim 23, further comprised of two end of said band portion being space-apart by a distance in dependence upon a state of said elastic portion.

25. The display apparatus of claim 23, further comprised of said absorber formed of one of rubber material and silicone material.

26. The display apparatus of claim 23, further comprised of a flange formed on said absorber, said flange covering one end of said bracket.

* * * * *